United States Patent
Ehlert et al.

(10) Patent No.: US 12,017,636 B2
(45) Date of Patent: Jun. 25, 2024

(54) AGRICULTURAL PRIME MOVER

(71) Applicant: CLAAS Tractor SAS, Vélizy-villacoublay (FR)

(72) Inventors: Christian Ehlert, Bielefeld (DE); Jan Carsten Wieckhorst, Paderborn (DE); Christian Birkmann, Versmold (DE); Jona Pieper, Nordkichen (DE)

(73) Assignee: CLAAS Tractor SAS, Vélizy-Villacoublay (FR)

( * ) Notice: Subject to any disclaimer, the term of this patent is extended or adjusted under 35 U.S.C. 154(b) by 870 days.

(21) Appl. No.: 16/993,476

(22) Filed: Aug. 14, 2020

(65) Prior Publication Data
US 2021/0046917 A1   Feb. 18, 2021

(30) Foreign Application Priority Data
Aug. 16, 2019   (DE) .......................... 102019122114.5

(51) Int. Cl.
  *B60W 30/00*   (2006.01)
  *A01B 79/00*   (2006.01)
  *B60W 10/30*   (2006.01)

(52) U.S. Cl.
  CPC ........... *B60W 10/30* (2013.01); *A01B 79/005* (2013.01); *B60W 2300/152* (2013.01);
  (Continued)

(58) Field of Classification Search
  None
  See application file for complete search history.

(56) References Cited

U.S. PATENT DOCUMENTS 6,119,442 A * 9/2000 Hale ..................... A01D 41/127
                                                                56/10.2 H
6,144,910 A * 11/2000 Scarlett ................ A01B 63/023
                                                                701/50

(Continued)

FOREIGN PATENT DOCUMENTS

EP          3243367 A2     11/2017

OTHER PUBLICATIONS

European Search Report for European Application 20169747.1-1004 dated Oct. 8, 2020.

*Primary Examiner* — Jonathan M Dager
(74) *Attorney, Agent, or Firm* — Lempia Summerfield Katz LLC

(57) ABSTRACT

An agricultural prime mover, such as a tractor, may be used to execute an agricultural work process. The agricultural prime mover includes work assemblies that can be adjusted with machine parameters, and can be coupled to an attachment for processing a field. The agricultural prime mover includes a control and regulation module that optimizes the work assemblies by ascertaining machine parameters for the work assemblies using optimization data with respect to at least one objective. The control and regulation module executes a multi-step optimization strategy, including a first step "at the farm" directed to optimizing a basic configuration of the agricultural prime mover, a second step "at the field" directed to optimizing an attachment-specific configuration of the agricultural prime mover, and a third step "in the field" directed to optimizing the adaptation of the basic configuration and the attachment-specific configuration while processing the field.

21 Claims, 2 Drawing Sheets

(52) U.S. Cl.
CPC ..... *B60W 2510/06* (2013.01); *B60W 2510/30* (2013.01); *B60W 2520/10* (2013.01); *B60W 2555/20* (2020.02); *B60W 2710/30* (2013.01); *B60W 2900/00* (2013.01)

(56) References Cited

U.S. PATENT DOCUMENTS

| | | | | |
|---|---|---|---|---|
| 6,863,604 | B2* | 3/2005 | Behnke | A01D 41/127 460/6 |
| 7,493,482 | B2* | 2/2009 | Ring | E02F 9/26 713/1 |
| 7,630,809 | B2* | 12/2009 | Behnke | A01D 41/127 701/50 |
| 7,670,218 | B2* | 3/2010 | Behnke | A01D 41/1276 460/4 |
| 8,676,453 | B2* | 3/2014 | Behnke | A01D 41/1276 701/50 |
| 9,125,344 | B2* | 9/2015 | Baumgarten | G06Q 50/02 |
| 9,334,827 | B2* | 5/2016 | Seelke | A01B 63/02 |
| 9,756,786 | B2* | 9/2017 | Heitmann | A01D 41/1273 |
| 9,807,926 | B2* | 11/2017 | Wilken | A01D 43/085 |
| 9,807,938 | B2* | 11/2017 | Wilken | A01F 12/18 |
| 10,085,372 | B2 | 10/2018 | Noyer | |
| 10,126,929 | B2* | 11/2018 | Baumgarten | A01D 41/127 |
| 10,318,138 | B2* | 6/2019 | Schøler | H04Q 9/00 |
| 10,462,957 | B2 | 11/2019 | Clement | |
| 11,185,005 | B2* | 11/2021 | Berger | A01B 59/04 |
| 11,284,564 | B2* | 3/2022 | Bormann | A01D 41/127 |
| 11,304,369 | B2* | 4/2022 | Bormann | A01D 41/141 |
| 11,576,294 | B2* | 2/2023 | Wieckhorst | F02D 45/00 |
| 2001/0032031 | A1* | 10/2001 | Ufheil | E02F 9/2228 700/169 |
| 2003/0121674 | A1* | 7/2003 | Scarlett | A01B 63/111 172/2 |
| 2010/0145572 | A1* | 6/2010 | Steckel | A01D 41/12 701/50 |
| 2010/0217474 | A1* | 8/2010 | Baumgarten | A01D 41/127 715/810 |
| 2012/0004812 | A1* | 1/2012 | Baumgarten | A01D 41/127 701/50 |
| 2012/0185137 | A1* | 7/2012 | Schedgick | A01B 63/112 701/49 |
| 2014/0019018 | A1* | 1/2014 | Baumgarten | A01D 41/127 701/50 |
| 2014/0053094 | A1* | 2/2014 | Grevinga | G06F 3/04883 715/771 |
| 2014/0171161 | A1* | 6/2014 | Bischoff | A01D 41/127 460/1 |
| 2014/0277905 | A1 | 9/2014 | Anderson | |
| 2015/0046043 | A1* | 2/2015 | Bollin | B60W 50/08 701/50 |
| 2017/0160916 | A1* | 6/2017 | Baumgarten | G06F 3/0486 |
| 2017/0188515 | A1* | 7/2017 | Baumgarten | A01D 41/127 |
| 2017/0227969 | A1 | 8/2017 | Murray | |
| 2017/0300219 | A1* | 10/2017 | Buchner | B60K 35/00 |
| 2017/0325394 | A1* | 11/2017 | Clement | A01B 71/02 |
| 2017/0325395 | A1* | 11/2017 | Noyer | B60R 16/0236 |
| 2017/0354080 | A1* | 12/2017 | Foster | G05D 1/0016 |
| 2018/0024549 | A1* | 1/2018 | Hurd | G05D 1/0016 701/2 |
| 2018/0290696 | A1* | 10/2018 | Schott | B62D 49/085 |
| 2018/0329618 | A1* | 11/2018 | Wieckhorst | A01B 69/007 |
| 2019/0021226 | A1* | 1/2019 | Dima | A01D 34/008 |
| 2019/0234044 | A1* | 8/2019 | Nygren | E02F 3/3654 |
| 2020/0029490 | A1* | 1/2020 | Bertucci | G06F 16/29 |
| 2020/0077561 | A1* | 3/2020 | Wieckhorst | A01B 69/004 |
| 2020/0315097 | A1* | 10/2020 | Desai | B60K 1/04 |
| 2021/0011471 | A1* | 1/2021 | Hurd | H04W 4/021 |
| 2021/0237520 | A1* | 8/2021 | Ehlert | B60C 23/002 |
| 2021/0264252 | A1* | 8/2021 | Davis | G06N 3/08 |
| 2022/0355873 | A1* | 11/2022 | Ricke | B62D 53/0878 |
| 2023/0047045 | A1* | 2/2023 | Wieckhorst | A01B 63/008 |
| 2023/0101136 | A1* | 3/2023 | Hansen | A01B 79/005 701/50 |

* cited by examiner

AGRICULTURAL PRIME MOVER

CROSS REFERENCE TO RELATED APPLICATION

This application claims priority under 35 U.S.C. § 119 to German Patent Application No. DE 102019122114.5 (filed Aug. 16, 2019), the entire disclosure of which is hereby incorporated by reference herein.

TECHNICAL FIELD

The invention relates to an agricultural prime mover, such as a tractor, for use in executing an agricultural work process.

BACKGROUND

An agricultural prime mover, such as a tractor, may have onboard work assemblies that can be adjusted by machine parameters and may be coupled to an attachment for processing a field depending on the agricultural work process. In so doing, the agricultural prime mover may be combined with a wide range of attachments. Such attachments are, for example, mowers, balers, rakes, tedders, tillage machinery, manure spreaders, etc. Some of the attachments may be mounted on the front of the agricultural prime mover and some can be mounted on the rear of the prime mover.

Example agricultural prime movers, which may be used as a tractor are disclosed in U.S. Pat. Nos. 10,462,957 and 10,085,372, both of which are incorporated by reference herein in their entirety. The agricultural prime movers may form a combination, such as generally coupled to an attachment or more particularly coupled to a tillage machine, wherein both the agricultural prime mover as well as the attachment optimize themselves and thereby also influence the other partner of the combination.

DESCRIPTION OF THE FIGURES

The present application is further described in the detailed description which follows, in reference to the noted plurality of drawings by way of non-limiting examples of exemplary implementation, in which like reference numerals represent similar parts throughout the several views of the drawings, and wherein.

DETAILED DESCRIPTION

Figure 1:
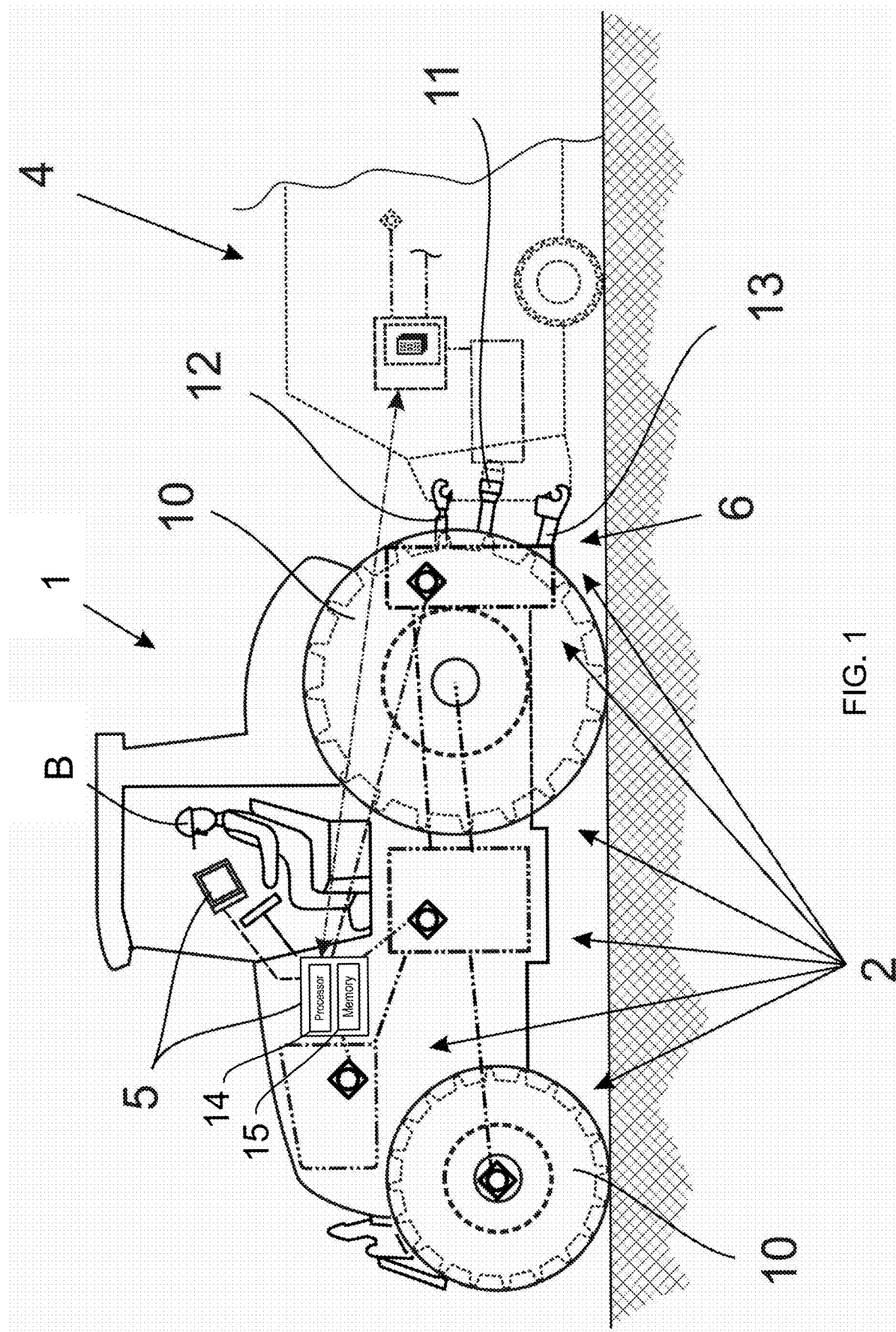
FIG. 1 shows a proposed agricultural prime mover, in this case designed as a tractor, with a schematically indicated attachment, and FIG. 2 schematically shows the proposed steps "at the farm", "at the field" and "in the field".

The methods, devices, systems, and other features discussed below may be embodied in a number of different forms. Not all of the depicted components may be required, however, and some implementations may include additional, different, or fewer components from those expressly described in this disclosure. Variations in the arrangement and type of the components may be made without departing from the spirit or scope of the claims as set forth herein. Further, variations in the processes described, including the addition, deletion, or rearranging and order of logical operations, may be made without departing from the spirit or scope of the claims as set forth herein.

As discussed in the background, agricultural prime movers may be coupled with attachments. One way to optimize operation of an agricultural prime mover is in a single step. However, this optimization may only be efficient when processing of a field is being performed with an already existing combination that includes the agricultural prime mover and attachment. In contrast, there may still be potential with regard to optimizing the agricultural prime mover in different stages (such as different progressive stages) of the agricultural work process in which the agricultural mover is not yet coupled to the attachment.

In this regard, in one or some embodiments, improvement of operation (such as optimization of operation) for the agricultural prime mover may be more efficiently performed at different progressive stages of the agricultural work process. For example, in one or some embodiments, the agricultural prime mover includes a control and regulation module which improves operation of, selects the machine parameters to use, or optimizes the work assemblies by ascertaining machine parameters for the work assemblies using data, such as optimization data, with respect to at least one objective.

During this process (such as the optimization process), several steps that differ from one another are processed. In particular, a multistep optimization strategy with different objectives in the individual steps may offer significant potential in the overall optimization of the agricultural prime mover. In this case, the strategy, such as the optimization strategy, may comprise any one, any combination, or all of the steps of: "at the farm"; "at the field"; and "in the field". For example, all three steps of "at the farm", "at the field", and "in the field" may be performed. The first step, "at the farm", relates to the optimization of the agricultural prime mover with respect to its basic configuration as preparation for the later-performed steps (e.g., preparation for both the "at the field" step and the "in the field" step). The second step, "at the field", relates to the optimization of the agricultural prime mover with respect to an attachment-specific configuration. The third step, "in the field", relates to the optimized adaptation of the basic configuration and the attachment-specific configuration while processing the field.

In particular, in one or some embodiments, the control and regulation module executes a multi-step optimization strategy with steps that differ from each other, the multi-step optimization strategy comprises a first step, "at the farm", in which an objective is the optimization of a basic configuration of the agricultural prime mover, the multi-step optimization strategy comprises a second step, "at the field", in which an objective is the optimization of an attachment-specific configuration of the agricultural prime mover, and the multi-step optimization strategy comprises at least one third step, "in the field", in which an objective is the adaptation of the basic configuration and the attachment-specific configuration while processing the field.

In one or some embodiments, one or more triggers (e.g., configurations, actions, or the like) may be used for determining when the different steps may be performed. For example, the steps may differ from one another with respect to the progress of the agricultural work process. Since the different objectives of the respective step are assigned to a progressive stage in the agricultural work process, the agricultural work process can be optimized by means of the agricultural prime mover. Specifically, the first step ("at the farm") may be associated with a beginning of the execution of the agricultural work process such that the agricultural prime mover is not yet coupled to the attachment in the first step. In this regard, a condition precedent to performing the first step comprises not performing a certain action (e.g., not yet having the attachment and the agricultural prime mover coupled to each other). Alternatively, or in addition, the second step ("at the field") may be associated with the coupling of the agricultural prime mover to the attachment. In this regard, coupling of the agricultural prime mover to the attachment may comprise a trigger or a condition precedent to performing the second step. Again, alternatively, or in addition, the third step ("in the field") may be associated with the use of the attachment in the field. In this regard, use of the attachment in the field may comprise a trigger or a condition precedent to performing the third step.

In one or some embodiments, the steps may be assigned to a positional area relative to the field, and may also be incorporated in the objectives to enhance efficiency. As one example, the first step may be assigned to a positional area remote from the field (such as on a farm), and/or the second step may be assigned to a positional area at the field, and/or the third step may be assigned a positional area in the field. In this regard, the trigger or condition precedent to performing the different optimization steps may be based on a determined position of one or both of the agricultural prime mover or the attachment (e.g., location information generated by a GPS receiver resident on one or both of the agricultural prime mover or the attachment may be transmitted to the control and regulation module in order for the control and regulation module to determine, based on the location information, whether to perform one, some, or all of the first step, the second step or the third step). The positional areas discussed herein are, however, not to be understood as distinctly limited areas that differ entirely from each other geographically. Rather, it is may be such that the respective steps are only partially assigned to different positional areas which may overlap each other (e.g., a first positional area assigned to the first step may or may not be mutually exclusive to a second positional area assigned to the second step; a second positional area assigned to the second step may or may not be mutually exclusive to a third positional area assigned to the third step).

In one or some embodiments, any one, any combination, or all of the optimization data, the work assemblies or the machine parameters for the respective steps may differ in terms of at least two, such as in terms of each of the three proposed steps. As one example with regard to optimization data, at least two of the steps (such as in each of the first step, second step and third step), use at least partly different types of optimization data to optimize the work assemblies. Alternatively, or in addition, at least partly different work assemblies are optimized in at least two of the steps (such as in each of the first step, second step and third step). Alternatively, or in addition, at least partly different machine parameters may be ascertained in at least two of the steps (such as in each of the first step, second step and third step). In this regard, the steps may iterate using different types of optimization data, optimizing different work assemblies, and/or determining different machine parameters. Accordingly, the steps may differ at least not only with respect to their objective, but also with respect to the existing and necessary optimization data, the machine parameters that are useful to adjust in the steps, and even the work assemblies to be optimized.

In one or some embodiments, machine parameters may be iteratively adjusted in one, some, or each of the first step, the second step, or the third step. In particular, one or more machine parameters may be ascertained in the first step (e.g., the one or more machine parameters may be adjusted or determined independent of the attachment), and/or one or more machine parameters may be ascertained in the second step (e.g., the one or more machine parameters may be adjusted or determined only after the attachment is coupled), and/or in the third step, one or more of the machine parameters may be ascertained in the third step (e.g., the one or more machine parameters may be adjusted or determined while the field is being processed). In a specific embodiment, at least one of the machine parameters ascertained in two or three of the steps are common (e.g., the same machine parameter is ascertained in the different steps). Alternatively, machine parameters determined in some, or all of the first step, second step, and third step are not common so that different machine parameters are determined in some, or all of the first step, second step, and third step.

In one or some embodiments, one or more machine parameters determined in a previous step may be constant or unchanged in subsequent step(s). For example, machine parameters may be ascertained in the first step, at least some of which may be constant (or unchanged) during the second step and during the third step. Alternatively, or in addition, machine parameters may be ascertained in the second step, at least some of which may be constant (or unchanged) during the third step. Still alternatively, or in addition, machine parameters may be ascertained in the third step at least partially based on data received from the attachment.

In one or some embodiments, the optimization data from the first step may comprise data for any one, any combination, or all of: providing ballast for the agricultural prime mover; a user profile; tires of the agricultural prime mover; a tire pressure of the tires of the agricultural prime mover; field data; forecast weather data; or additional devices that can be mounted for the agricultural work process. In this way, optimization data, through which the basic configuration may be improved, may be generated as part of the first step. Further, in one or some embodiments, the machine parameters determined in the first step may include any one, any combination, or all of: ballast weights; a tire type; tire pressures; lane width; part of the machine parameters of the first step may be manually adjusted (e.g., by a mounting process); or calibrating of work assemblies. Thus, the corresponding machine parameters may be determined in the first step.

Likewise, the optimization data generated from the second step may include any one, any combination, or all of: data for a device connection (e.g., a three-point mechanism of the agricultural prime mover); a type of the attachment; or current weather data. Alternatively, or in addition, the machine parameters determined in the second step may include any one, any combination, or all of: a chassis height; a rotational speed of a PTO shaft; an adjustment of an upper link; or an adjustment of a lower link.

In one or some embodiments, the optimization data for the third step may comprise optimization data (e.g., received from the attachment) for any one, any combination, or all of: a driving speed; an oil pressure; an oil volume; a driving direction; a contact pressure; a working depth; a rotational speed of the PTO shaft; engine/transmission parameters (e.g., an engine droop). Alternatively, or in addition, the machine parameters determined in the third step may include any one, any combination, or all of: driving speed; oil volume; driving direction; rotational speed of the PTO shaft; or engine/transmission parameters (e.g., an engine droop).

In one or some embodiments, the control and regulation module may optimize the work assemblies in the third step based on any one, any combination, or all of: the optimization data with respect to the objective; a characteristic map regulator; a preselected strategy; or fixed rules. Alternatively, or in addition, in the third step, the control and regulation module may dictate to or command the attachment to adjust at least one machine parameter and/or transmit data on forefield recognition to the attachment. In this way, the third step may optimize operation of the work assemblies.

Referring to the figures, FIG. 1 shows an example agricultural prime mover 1, such as a tractor. This agricultural prime mover 1 is used to execute an agricultural work process. For example, the agricultural work process may, for example, involve harvesting, such as the arrival and departure of the harvested grain. The agricultural prime mover 1 has work assemblies 2 that may be adjusted with machine parameters. The machine parameters may be one or more adjustable parameters, discussed further below. Example machine parameters include providing ballast for the agricultural prime mover 1 and a rotational speed of the motor. Other machine parameters are contemplated.

Figure 2:
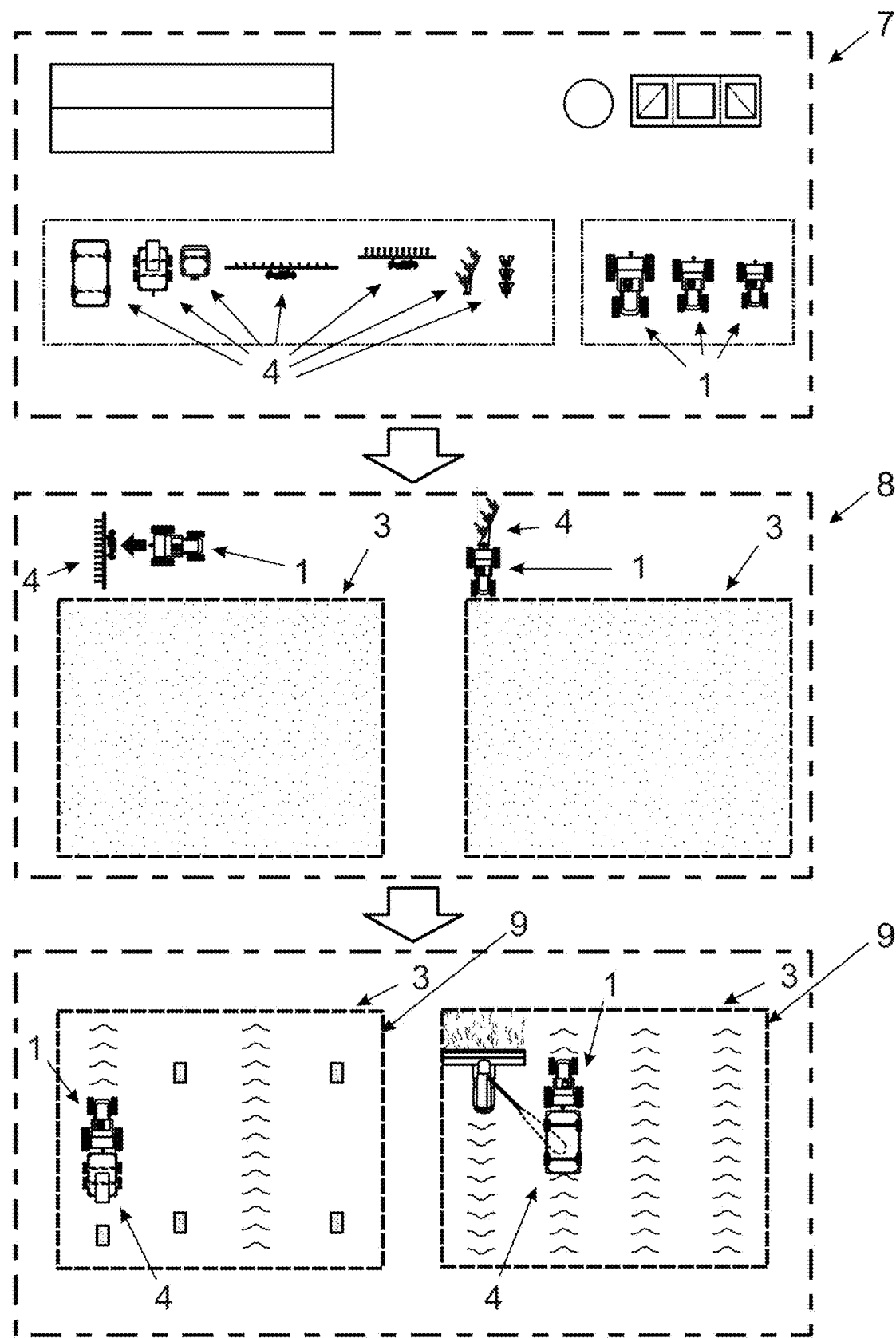

The agricultural prime mover 1 may be coupled to an attachment 4 for processing a field 3. Example attachments are discussed above and also with regard to FIG. 2. In one or some embodiments, the term "coupleable" refers to a mechanical, and at least electrical and/or hydraulic connection as well between the agricultural prime mover 1 and the attachment 4.

The agricultural prime mover 1 has a control and regulation module 5 which optimizes the work assemblies 2 by ascertaining machine parameters for the work assemblies 2 using optimization data with respect to at least one objective. In one or some embodiments, the control and regulation module 5 independently and automatically adjusts at least one, some or all of the machine parameters in the work assemblies 2. The control and regulation module 5 may specify another part of the machine parameters to a user B for adjustment. Thus, in one or some embodiments, one or more parameters may be manually adjusted based on an instruction generated from the control and regulation module 5 (e.g., providing ballast may be manually adjust based on an instruction from the control and regulation module 5).

In one or some embodiments, the control and regulation module 5 may comprise any type of computing functionality and may include processor 14 and memory 15, which may be resident therein. Though processor 14 (which may comprise a microprocessor, controller, PLA or the like) and memory 15 are depicted as separate elements, they may be part of a single machine, which includes a microprocessor (or other type of controller) and a memory unit. The microprocessor and memory unit are merely one example of a computational configuration. Other types of computational configurations are contemplated. For example, all or parts of the implementations may be circuitry that includes a type of controller, including an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry, such as processor 14, may store in or access instructions from memory 15 for execution, or may implement its functionality in hardware alone. The instructions, which may comprise computer-readable instructions, may implement the functionality described herein and may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described herein or illustrated in the drawings. Thus, the control and regulation module 5, using the processor 14 and the memory 15, may perform any one, any combination, or all of: the analysis as discussed herein (such as the multi-step optimization strategy); the commands to control one or more aspects of the agricultural prime mover 1; or an output on a display.

The machine parameters of the work assemblies 2 may, in principle, be machine parameters on every level of abstraction. It is also contemplated that a machine parameter with a higher level of abstraction may influence another machine parameter with a lower level of abstraction. The term "parameter" may therefore be interpreted broadly. In one or some embodiments, the machine parameters are direct settings that are clearly adjustable per se. In contrast, a strategy such as "save diesel" is not considered a machine parameter. The term "work assemblies" may also be interpreted broadly since a work assembly 2 may be independent or may be part of another work assembly 2. Furthermore, the optimization of the work assemblies 2 is not to be understood solely as the optimization of the individual work assembly 2, but may rather be an optimization within the overall context of the agricultural prime mover 1.

During the progress of executing the agricultural work process, the boundary conditions of the agricultural work process may vary widely. In order to best adapt the agricultural prime mover 1 to the different boundary conditions, it is contemplated that the control and regulation module 5 executes a multi-step optimization strategy with steps that differ from each other. Thus, in one or some embodiments, it is inherent to these steps that they differ from each other with respect to their boundary conditions and/or with respect to their objectives.

The multi-step optimization strategy comprises a first step "at the farm" in which an objective is to optimize a basic configuration of the agricultural prime mover 1. The term "basic configuration" is described in greater detail below; however, the type of tires is discussed merely as an example. Specifically, the type of tires of an agricultural prime mover 1 cannot be changed as desired at any point in time and must therefore have been sensibly chosen prior to the start of executing the agricultural work process. In this regard, the type of tires is an example of a basic configuration of the agricultural prime mover 1, and more specifically an example of a basic configuration which may not be considered for optimization in later steps (such as in the third step).

It is contemplated for the multi-step optimization strategy to also comprise a second step "at the field" in which an objective is to optimize an attachment-specific configuration of the agricultural prime mover 1. The term "attachment-specific" relates to those machine parameters which have an influence on the functioning of the attachment 4 within the broadest sense, such as those machine parameters whose function is also influenced by the attachment 4. Whereas the aforementioned choice of tires is ascribable to the basic configuration of the agricultural prime mover 1 (and thus the choice of tires may be made independently of any attachment to the agricultural prime mover 1), the agricultural prime mover 1, particularly in the region of a three-point mechanism of a modern tractor, has various work assemblies 2 with their machine parameters, which belong to the agricultural prime mover 1 but whose configuration is however attachment-specific.

It is contemplated that the multi-step optimization strategy further comprises a third step "in the field" in which an objective is to adapt the basic configuration (determined in the first step) and the attachment-specific configuration (determined in the second step) while processing the field 3. In this regard, the third step relates to the actual processing of the field 3, whereas the first step and the second step serve to prepare for the third step. Correspondingly, the first step, the second step, and the third step may be performed in this specific sequence. It is also contemplated for several runs of the second and third step to follow the first step when for example the attachment 4 is exchanged after traversing the second and third step. In particular, the processing for the first step to determine the basic configuration may be applicable to a variety of attachment-specific configurations and to a variety of processing-specific applications. Thus, the first step may be performed once and may be applied to multiple attachment-specific configurations (optimized for the different ones of the multiple attachment-specific configurations via different applications of the second step) and/or may be applied to multiple processing-specific applications (optimized for the different ones of the multiple processing-specific applications via different applications of the third step). In addition to the contemplated first, second and third steps, intermediate steps, preceding and/or following any one, any combination or all of the first, second and third steps are contemplated.

FIG. 3 schematically shows the disclosed first, second and third steps within the respective outer dashed line frame. In this case and preferably, the steps differ with respect to a progressive stage of the agricultural work process. The term "progressive stage" in this case refers to different tasks of the agricultural prime mover 1 during the agricultural work process. In one or some embodiments, the first step is then associated with a beginning of the execution of the agricultural work process, with the agricultural prime mover 1 not yet being coupled to the attachment 4 in the first step. In addition or alternatively, the second step may be associated with the coupling of the agricultural prime mover 1 to the attachment 4. In addition or alternatively, the third step may be associated with the use of the attachment 4 in the field 3.

In this case, the steps are each associated with a positional area 7, 8, 9 relative to the field 3. Thus, in one or some embodiments, the first step is associated with a positional area 7 remote from the field, such as in a farm (e.g., responsive to determining that the agricultural prime mover 1 is in positional area 7, performing the first step; though, it is contemplated that the first step need not be performed every time the agricultural prime mover 1 is in positional area 7, as discussed above). In addition or alternatively, the second step may be associated with a positional area 8 at the field (e.g., responsive to determining that the agricultural prime mover 1 is in positional area 8, performing the second step). Again, in addition or alternatively, the third step can be associated with a positional area 9 in the field (e.g., responsive to determining that the agricultural prime mover 1 is in positional area 9, performing the third step). Thus, the different positional areas may be separate geographically from each other.

In one or some embodiments, the first step relates to the optimization of the basic configuration, in particular on the farm, at the beginning of executing the agricultural work process. Accordingly, the user B may adjust various machine parameters before driving off with the agricultural prime mover 1. The control and regulation module 5 may match other machine parameters with a pending road trip and the daily schedule. Then, the user B may drive to the field 3. In this case, the agricultural prime mover 1 may already be coupled to the attachment 4, but in particular only towing it (e.g., not actually using the attachment 4 in the field). Just as advantageously, the attachment 4 may however already be available on the field.

The second step may relate to an adjustment of machine parameters for the attachment 4, or a coupling to the attachment 4 and an adjustment of machine parameters for the attachment 4, or the adjustment of attachment-specific machine parameters for the agricultural prime mover 1 directly on the field 3. In this case, attachment-specific machine parameters as well as prime-mover-specific machine parameters can be adjusted. In the second step, those machine parameters may be adjusted which were previously matched for a road trip. In one or some embodiments, the user B drives the agricultural prime mover 1 onto the field 3 after optimizing the second step and starts processing the field.

As evident in the explained example, the situation may be such that in at least two of the steps, such as in at least three of the steps (e.g., in each of the first step, the second step, and the third step), at least partly different types of optimization data are used to optimize the work assemblies 2. Whereas for example a daily schedule is relevant in the first step (with the daily schedule being an example of the type of optimization data used for the first step), specific data of the attachment 4 may be used in the second step that refer to the one-time adjustment thereof (with the specific data of the attachment 4 being an example of the type of optimization data used for the second step), and then live or real-time sensor data from the agricultural prime mover 1 and/or from the attachment 4 may be used as optimization data in the third step (with the live or real-time sensor data from the agricultural prime mover 1 and/or from the attachment 4 being an example of the type of optimization data used for the third step).

In this regard, the optimization data may in this case originate from various sources, such as from any one, any combination, or all of: from the agricultural prime mover 1 itself (e.g., from sensors of the agricultural prime mover 1); from an external data source (e.g., a farm computer or cloud server); or from the attachment 4 (e.g., from sensors of the attachment 4). The optimization data originating from the attachment 4 may be transmitted via a direct communication link between the agricultural prime mover 1 and the attachment 4. In one or some embodiments, no optimization data originating from a direct communication between the agricultural prime mover 1 are used in the first step. In the second step, optimization data originating from a direct communication between the agricultural prime mover 1 and the attachment 4 may already be used, and the optimization data may be used in the third step.

In this case, at least partly different work assemblies 2 may be optimized in at least two of the steps, such as in each of the first step, the second step, and the third step. In addition, at least partly different machine parameters may be ascertained or determined in at least two of the steps, such as in each of the first step, the second step, and the third step. The advantages of these embodiments are also evident from the above-explained example and the inherent differences between the various steps.

In one or some embodiments, at least some machine parameters are ascertained or determined in the first step which may be adjusted independently of the attachment 4. This results from the fact that, in the first step, the attachment 4 may not yet be coupled to the agricultural prime mover 1 (e.g., multiple different attachments 4 may potentially be coupled to the agricultural prime mover 1 so that the first step may determine the one or more machine parameters independently of the actual attachment 4 later coupled to the agricultural prime mover 1). In the second step, at least some machine parameters may be ascertained or determined which can only be adjusted when the attachment 4 is coupled (e.g., after the coupling of the specific attachment 4 (which may be selected from a plurality of potential attachments 4) to the agricultural prime mover 1, the second step may optimize for the specific attachment 4 to the agricultural prime mover 1). In this case for example, the kinematics of a rear linkage of the agricultural prime mover 1 are mentioned and considered. Though, it may be possible for the kinematics to be adjusted without the attachment 4 (e.g., kinematics may be adjusted without first learning the specific attachment 4 (which is selected from a plurality of potential attachments 4) to the agricultural prime mover 1); however, adjustment typically only makes sense after coupling. In the third step, such as at least sometimes, machine parameters are ascertained which change while the agricultural prime mover 1 is processing the field 3.

As mentioned above, at least some of the machine parameters are automatically adjusted by the control and regulation module 5 in any one, any combination, or all of: the first step; the second step; or the third step. In one or some embodiments, not all of the machine parameters are automatically adjusted, such as in the first step and/or the second step. In one or some embodiments, however in the third step, all of the machine parameters are adjusted automatically, at least temporarily. The user B therefore does not have to interrupt the processing of the field 3.

In one or some embodiments, it is contemplated that machine parameters are ascertained in the first step, at least some of which are constant (e.g., unchanged) during the second and during the third step. Also advantageously, machine parameters can be ascertained alternatively or in addition in the second step, at least some of which are constant (e.g., unchanged) during the third step. In this regard, determination with respect to one or more machine parameters may be performed in stages (such as in a previous stage) so that the determination is unchanged in a later stage. It is further contemplated for only machine parameters to be ascertained during the first step and the second step that are then held constant during the third step (e.g., machine parameters determined in the first step and/or the second step are unchanged during the third step). In this case, various adaptations of other machine parameters of the basic configuration and the attachment-specific configuration would however nonetheless be ascertained or determined and may be adjusted automatically during the third step (e.g., a certain set of parameters not determined during the first step or the second step are ascertained or determined in the third step). Typically however, the machine parameters ascertained during the steps may at least partially overlap (e.g., a first set of one or more machine parameters determined in the first step may be constant (and will not change) after performing the second step and/or the third step; alternatively, the first set of one or more machine parameters determined in the first step may change responsive to performing the second step and/or the third step; a second set of one or more machine parameters determined in the second step may be constant (and will not change) after performing the third step; alternatively, the second set of one or more machine parameters determined in the second step may change responsive to performing the third step).

In one or some embodiments, the machine parameters are ascertained or determined in the third step at least partially based on data received from the attachment 4. These data can, for example, be sensor data of the attachment 4 (e.g., sensor data being generated as the attachment is used in the field for processing of crops).

Thus, optimization data of the machine parameters may be identified. In this case, the optimization data from the first step may comprise data for any one, any combination, or all of: providing ballast for the agricultural prime mover 1; for a user profile; for tires of the agricultural prime mover 1; for tire pressure of the tires of the agricultural prime mover 1; for field data; for forecast weather data; or additional devices that may be mounted on the agricultural prime mover 1 for the agricultural work process. With respect to the tires of the agricultural prime mover 1, various aspects of the tires, such as the type and/or the size of the tires 10, are contemplated. The user profile may include various preferred settings of machine parameters and/or the control and regulation module 5. The field data may include data on any one, any combination, or all of: dryness; a planted type of crop; a type of soil; or a soil state. The forecast weather data may, for example, comprise information on whether strong rain is anticipated. Correspondingly, the tires may be adapted to soil that is expected to become wetter. The mountable additional devices may, for example, be a camera for recognizing obstacles (e.g., game), which may be advantageous when harvesting.

Analogously, the machine parameters ascertained in the first step may include any one, any combination, or all of: ballast weights; a tire type; tire pressures; or a lane width (e.g., an adjustable lane width of the rear axle). As already indicated, it may be provided that part of the machine parameters of the first step are manually adjusted. This may, in particular, occur through a mounting process. Alternatively or in addition, work assemblies 2 may be calibrated in the first step. In manual adjustment, the control and regulation module 5 may generate and output (such as via an output device) the corresponding machine parameters to the user B.

In this case, the optimization data from the second step may include any one, any combination, or all of: data for a device connection (e.g., a three-point mechanism 6) of the agricultural prime mover 1; a type of the attachment 4; or current weather data. In addition to the type of attachment 4, the optimization data of the second step may, in particular, also include highly specific identification data of the attachment 4. It may thus be provided that the optimization data of the first step generally include the type of attachment 4 (e.g., the type being "plow", which may be selected from a plurality of types of attachments), after which the ballast of the agricultural prime mover 1 can be correspondingly adjusted on the farm. The specific type of plow (e.g., selected from a plurality of types of plow) and its properties may, however, then be associated with the second step when the plow is coupled to the agricultural prime mover 1 (and as such may be optimized in the second step).

The machine parameters ascertained or determined in the second step may include any one, any combination, or all of: a chassis height; a rotational speed of a PTO shaft 11; an adjustment of an upper link 12; or an adjustment of a lower link 13. Particularly, these machine parameters frequently cannot be adjusted, or usefully adjusted, before the coupling between the agricultural prime mover 1 and the attachment 4. In this regard, these machine parameters may not be determined or ascertained in the first step, but instead are ascertained in the second step.

In this case, the optimization data for the third step comprise optimization data received from the attachment 4 and/or the agricultural prime mover 1 for any one, any combination, or all of: a driving speed; an oil pressure; an oil volume; a driving direction; a contact pressure; a working depth; a rotational speed of the PTO shaft 11; or engine/transmission parameters (e.g., an engine droop). In this case, the oil volume refers to the hydraulic fluid of the agricultural prime mover 1, which is transferred via the coupling to the attachment 4. Depending on the complexity of the attachment 4, it may occur that this significantly improved data may, for example, result in an optimum or maximum driving speed.

Moreover analogously, the machine parameters ascertained or determined in the third step may include any one, any combination, or all of: a driving speed; an oil volume; a driving direction; a rotational speed of the PTO shaft 11; or engine/transmission parameters (e.g., an engine droop). The machine parameters ascertained in the third step may be machine parameters which in one or some embodiments are regularly adapted while processing the field 3. This adaptation or adjustment of the machine parameters responsive to analysis in the third step may occur continuously, and/or according to a certain rhythm (e.g., at predetermined intervals), and/or upon request from the operator.

In this case, the control and regulation module 5 optimizes the work assemblies 2 in the third step based on any one, any combination, or all of: based on the optimization data with respect to the objective; based on a characteristic map regulator; based on a preselected strategy; or based on fixed rules. A characteristic map regulator may, for example, contain a characteristic map that indicates the rotational speed of the PTO shaft 11 that is optimal with a particular oil volume under certain field conditions. The preselected strategy can for example comprise the strategies of "efficiency", "performance", "work quality" and "comfort", with each containing somewhat different requirements, for example, for the chassis and suspension. One fixed rule may, for example, be a maximum oil flow for a specific attachment 4.

In this case, in the third step, the control and regulation module 5 may dictate to or command the attachment 4 at least one machine parameter to be adjusted. In addition or alternatively, the control and regulation module 5 may transmit forefield recognition data to the attachment 4, such as the fact that a wild animal has been identified in the field, and therefore indicative to the attachment 4 that all work assemblies 2 should be immediately stopped.

The disclosed multistep optimization strategy may be processed by a user using a natural language dialog with the control and regulation module 5 in the context of the agricultural work process by using the proposed agricultural prime mover 1. This enables the user B to quickly grasp and provide the necessary information.

It is intended that the foregoing detailed description be understood as an illustration of selected forms that the invention can take and not as a definition of the invention. It is only the following claims, including all equivalents, that are intended to define the scope of the claimed invention. Further, it should be noted that any aspect of any of the preferred embodiments described herein may be used alone or in combination with one another. Finally, persons skilled in the art will readily recognize that in preferred implementation, some or all of the steps in the disclosed method are performed using a computer so that the methodology is computer implemented. In such cases, the resulting physical properties model may be downloaded or saved to computer storage.

LIST OF REFERENCE NUMBERS

1 Agricultural prime mover
2 Work assemblies
3 Field
4 Attachment
5 Control and regulation module
6 Three-point mechanism
7 Positional area remote from the field
8 Positional area at the field
9 Positional area in the field
10 Tires
11 PTO shaft
12 Upper link
13 Lower link
14 Processor
15 Memory
B User

The invention claimed is:

1. An agricultural prime mover configured to execute an agricultural work process comprising:
   one or more work assemblies configured for adjustment with one or more machine parameters;
   an attachment configured to process a field; and
   a control and regulation module configured to control the one or more work assemblies by ascertaining the one or more machine parameters for the one or more work assemblies using data with respect to at least one objective, wherein the control and regulation module is configured to execute a multi-step strategy with steps that differ from each other, the multi-step strategy comprising:
      a first step, occurring at a farm, in which an objective is improvement of a basic configuration of the agricultural prime mover;
      a second step, occurring at the field, in which an objective is improvement of an attachment-specific configuration of the agricultural prime mover; and
      a third step, occurring in the field, in which an objective is an adaptation of the basic configuration and the attachment-specific configuration while the agricultural prime mover is processing the field,
   wherein each of the first step, the second step, and the third step are at different stages in terms of progress in the agricultural work process; and
   wherein the control and regulation module is configured to perform one or more of:
      the first step prior to coupling of the attachment to the agricultural prime mover;
      the second step responsive to detecting coupling of the agricultural prime mover to the attachment; or
      the third step responsive to determining that the agricultural prime mover is using the attachment to process the field.

2. The agricultural prime mover of claim 1, wherein the first step optimizes the basic configuration of the agricultural prime mover independently of any attachment coupled to the agricultural prime mover;
 wherein the control and regulation module is configured to perform the first step prior to coupling of the attachment to the agricultural prime mover;
 wherein the first step is assigned to a positional area remote from the field; and
 wherein the control and regulation module is configured to perform the first step responsive to determining that a location of the agricultural prime mover is at the positional area remote from the field.

3. The agricultural prime mover of claim 1, wherein the control and regulation module is configured to perform the second step responsive to detecting coupling of the agricultural prime mover to the attachment;
 wherein the second step is assigned to a positional area at the field; and
 wherein the control and regulation module is configured to perform the second step responsive to determining that a location of the agricultural prime mover is at the positional area at the field.

4. The agricultural prime mover of claim 1, wherein the control and regulation module is configured to perform the third step responsive to determining that the agricultural prime mover is using the attachment to process the field;
 wherein the third step is assigned to a positional area in the field; and
 wherein the control and regulation module is configured to perform the third step responsive to determining that a location of the agricultural prime mover is at the positional area in the field.

5. The agricultural prime mover of claim 1, wherein the control and regulation module uses for each of the first step, the second step or the third step at least partly different types of optimization data to optimize the work assemblies; and
 wherein the control and regulation module optimizes at least partly different work assemblies in each of the first step, the second step, the third step.

6. The agricultural prime mover of claim 1, wherein the control and regulation module ascertains at least partly different machine parameters in each of the first step, the second step, and the third step.

7. The agricultural prime mover of claim 1, wherein the control and regulation module ascertains at least some machine parameters in the first step independently of the attachment, in the second step responsive to determining that the attachment is coupled to the agricultural prime mover, and in the third step in which at least one machine parameter is ascertained and changes while the field is being processed.

8. The agricultural prime mover of claim 1, wherein the control and regulation module ascertains one or more machine parameters in the first step, at least one of which the control and regulation module holds constant during the second step and the third step;
 wherein the control and regulation module ascertains one or more other machine parameters in the second step, at least one of which the control and regulation module holds constant during the third step; and
 wherein the control and regulation module ascertains one or more still other machine parameters in the third step at least partially based on data received from the attachment.

9. The agricultural prime mover of claim 1, wherein the control and regulation module determines, responsive to performing the first step, optimization data, the optimization data comprises one, some, or all of: data for providing ballast for the agricultural prime mover; data for a user profile; data for tires of the agricultural prime mover; data for a tire pressure of the tires of the agricultural prime mover; data for forecast weather data; or data for additional devices that may be mounted for the agricultural work process.

10. The agricultural prime mover of claim 1, wherein the control and regulation module ascertains, responsive to performing the first step, machine parameters, the machine parameters comprises one, some, or all of: ballast weights; a tire type; tire pressures; or a lane width; and
 wherein the control and regulation module ascertains, responsive to performing the first step, calibration of one or more work assemblies.

11. The agricultural prime mover of claim 1, wherein the control and regulation module determines, responsive to performing the second step, optimization data, the optimization data comprises one, some, or all of: data for a device connection for the agricultural prime mover; data for a type of the attachment; or data for current weather data.

12. The agricultural prime mover of claim 1, wherein the control and regulation module ascertains, responsive to performing the second step, machine parameters, the machine parameters comprises one, some, or all of: a chassis height; a rotational speed of a PTO shaft; or an adjustment of one or both of an upper link or a lower link.

13. An agricultural prime mover configured to execute an agricultural work process comprising:
 one or more work assemblies configured for adjustment with one or more machine parameters;
 an attachment configured to process a field; and
 a control and regulation module configured to control the one or more work assemblies by ascertaining the one or more machine parameters for the one or more work assemblies using data with respect to at least one objective, wherein the control and regulation module is configured to execute a multi-step strategy with steps that differ from each other, the multi-step strategy comprising:
  a first step occurring at a farm, in which an objective is improvement of a basic configuration of the agricultural prime mover;
  a second step occurring at the field, in which an objective is improvement of an attachment-specific configuration of the agricultural prime mover; and
  a third step occurring in the field, in which an objective is an adaptation of the basic configuration and the attachment-specific configuration while the agricultural prime mover is processing the field,
 wherein each of the first step, the second step, and the third step are at different stages in terms of progress in the agricultural work process; and
 wherein the control and regulation module determines, responsive to performing the third step and based on data received from the attachment, optimization data, the optimization data comprises one, some, or all of: data for a driving speed; data for an oil pressure; data for an oil volume; data for a driving direction; data for a contact pressure; data for a working depth; data for a rotational speed of a PTO shaft; or data regarding engine/transmission parameters including an engine droop.

14. The agricultural prime mover of claim 1, wherein the control and regulation module ascertains, responsive to performing the third step, machine parameters, the machine parameters comprises one, some, or all of: a driving speed; an oil volume; a driving direction; a rotational speed of a PTO shaft; or engine/transmission parameters including an engine droop.

15. An agricultural prime mover configured to execute an agricultural work process comprising:
one or more work assemblies configured for adjustment with one or more machine parameters;
an attachment configured to process a field; and
a control and regulation module configured to control the one or more work assemblies by ascertaining the one or more machine parameters for the one or more work assemblies using data with respect to at least one objective, wherein the control and regulation module is configured to execute a multi-step strategy with steps that differ from each other, the multi-step strategy comprising:
a first step occurring at a farm, in which an objective is improvement of a basic configuration of the agricultural prime mover;
a second step occurring at the field, in which an objective is improvement of an attachment-specific configuration of the agricultural prime mover; and
a third step occurring in the field, in which an objective is an adaptation of the basic configuration and the attachment-specific configuration while the agricultural prime mover is processing the field,
wherein each of the first step, the second step, and the third step are at different stages in terms of progress in the agricultural work process;
wherein the control and regulation module is configured to optimize the work assemblies in the third step based on any one, any combination, or all of: optimization data with respect to an objective; a characteristic map regulator; a preselected strategy; or fixed rules; and
wherein the control and regulation module in the third step is configured to dictate to the attachment at least one machine parameter to be adjusted and to transmit data on forefield recognition to the attachment.

16. The agricultural prime mover of claim 1, wherein the control and regulation module is configured to determine, responsive to performing the third step, one or more of driving speed, oil pressure, oil volume, driving direction, PTO shaft rotational speed, or engine droop.

17. The agricultural prime mover of claim 1, wherein the control and regulation module is configured to determine, responsive to performing the second step, at least one aspect regarding mechanical connection of an attachment to the agricultural prime mover; and
wherein the control and regulation module is configured to determine, responsive to performing the third step, at least one aspect regarding operation of the attachment with the agricultural prime mover while the agricultural prime mover is processing the field.

18. The agricultural prime mover of claim 1, wherein the control and regulation module is configured to perform one or more of:
the second step responsive to detecting coupling of the agricultural prime mover to the attachment; or
the third step responsive to determining that the agricultural prime mover is using the attachment to process the field.

19. The agricultural prime mover of claim 1, wherein the first step is assigned to a positional area remote from the field;
wherein the second step is assigned to the positional area at the field;
wherein the third step is assigned to the positional area in the field;
wherein the control and regulation module is configured to perform one or more of:
the first step responsive to determining that a location of the agricultural prime mover is at the positional area remote from the field;
the second step responsive to determining that a location of the agricultural prime mover is at the positional area at the field; or
the third step responsive to determining that a location of the agricultural prime mover is at the positional area in the field.

20. The agricultural prime mover of claim 1, wherein the control and regulation module is configured to perform one or more of:
determine, independently of any attachment coupled to the agricultural prime mover, the basic configuration of the agricultural prime mover;
determine, responsive to performing the second step, at least one aspect regarding mechanical connection of an attachment to the agricultural prime mover; and
determine, responsive to performing the third step, at least one aspect regarding operation of the attachment with the agricultural prime mover while the agricultural prime mover is processing the field.

21. The agricultural prime mover of claim 1, wherein the control and regulation module performs one or more of:
ascertains one or more machine parameters in the first step, at least one of which the control and regulation module holds constant during the second step and the third step;
ascertains one or more other machine parameters in the second step, at least one of which the control and regulation module holds constant during the third step; or
ascertains one or more still other machine parameters in the third step at least partially based on data received from the attachment.

* * * * *